(12) United States Patent
Bogrett et al.

(10) Patent No.: US 6,228,476 B1
(45) Date of Patent: May 8, 2001

(54) COATED FOAM INSULATION AND METHOD OF MAKING THE SAME

(75) Inventors: Blake Boyd Bogrett; Monroe William Shumate, both of Littleton; Royce Michael Feagans, Morrison, all of CO (US)

(73) Assignee: Johns Manville International, Inc., Denver, CO (US)

(*) Notice: Subject to any disclaimer, the term of this patent is extended or adjusted under 35 U.S.C. 154(b) by 0 days.

(21) Appl. No.: 09/183,892

(22) Filed: Oct. 30, 1998

(51) Int. Cl.[7] .............................. B32B 3/06; B32B 5/14; B32B 3/00
(52) U.S. Cl. .................................. 428/306.6; 428/309.9; 428/316.6
(58) Field of Search ................. 524/279; 521/54; 428/317.9, 306.6, 309.9, 316.6, 317.1

(56) References Cited

U.S. PATENT DOCUMENTS 5,256,716 * 10/1993 Haasl et al. ..................... 524/279
5,763,067 * 6/1998 Bruggemann et al. ........... 428/317.9
5,953,818 * 9/1999 Matthews et al. ................ 29/890.144

* cited by examiner

Primary Examiner—Blaine Copenheaver
Assistant Examiner—Christopher C. Pratt
(74) Attorney, Agent, or Firm—John D. Lister

(57) ABSTRACT

A foam insulation sheet has a major surface, such as the interior surface of a duct liner over which gases flow within a duct, coated with a relatively smooth, tough elastomeric coating of substantially uniform thickness. Preferably, the coating has a tough skin and penetrates into interstices of the major surface of the foam sheet to firmly bond the elastomeric coating to the foam sheet. One method of forming the tough skin on the coating includes contacting a frothed aqueous cross-linkable acrylic latex emulsion, applied to the major surface of the foam sheet, with a hot ironing surface to dewater an exposed surface of the frothed emulsion, to free bubbles from the exposed surface of the frothed emulsion at the exposed surface of the frothed emulsion, prior to curing the remainder of the frothed aqueous cross-linkable acrylic latex emulsion.

3 Claims, 2 Drawing Sheets

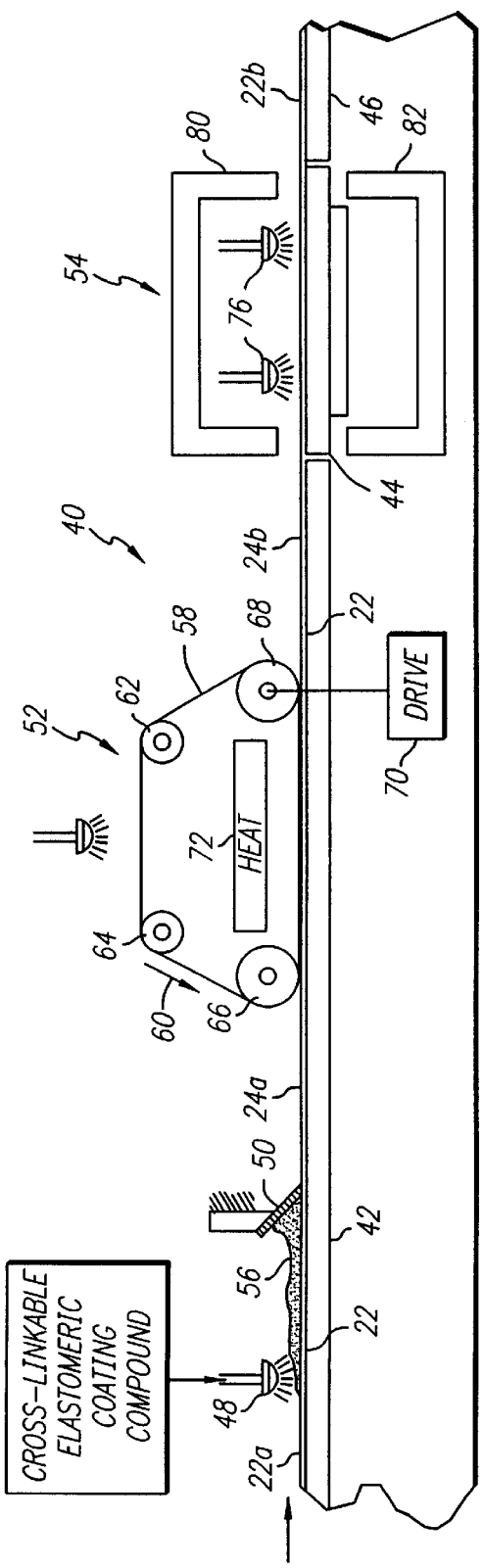
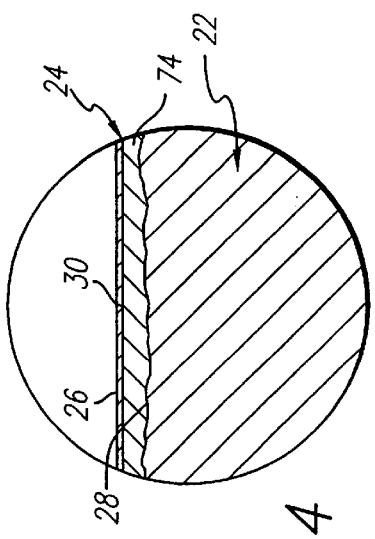
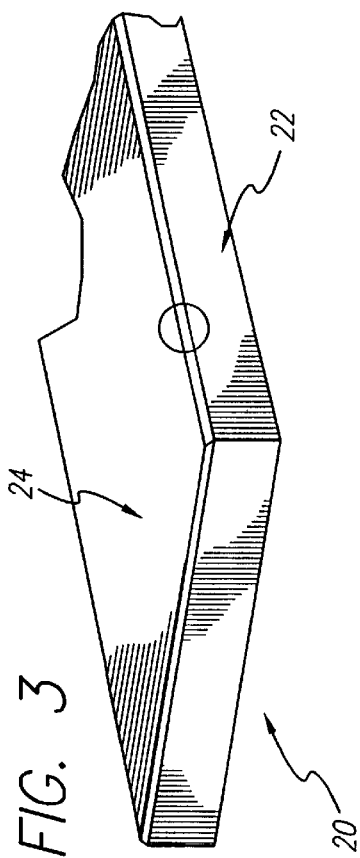

COATED FOAM INSULATION AND METHOD OF MAKING THE SAME

BACKGROUND OF THE INVENTION

The present invention relates to a coated foam insulation sheet and, in particular, to a coated foam insulation sheet, especially suited to be a duct liner, with a relatively smooth tough elastomeric coating on one or both of its major surfaces, and the method of making such a coated foam insulation sheet.

Foam sheets are used as duct liners to line air ducts and the like, especially, for applications such as a clean room air supply, where fibrous insulations can not be used to line the air ducts. In such applications, airborne dust and particles, including viruses, bacteria, pathogens and other infectious or contaminating agents, tend to collect or accumulate in any surface irregularities present on the interior surface of the duct liner and such surface irregularities increase the frictional resistance to air flow through the air ducts. Thus, there has been a need to reduce surface irregularities on such duct liners and provide a smooth tough interior surface on foam insulation sheets used as duct liners, especially open cell foam insulation sheets.

U.S. Pat. No. 4,990,370, On Line Surface and Edge Coating of Fiber Glass Duct Liners, issued Feb. 5, 1991 (hereinafter "the '370 patent") and U.S. Pat. No. 5,211,988, Method for Preparing a Smooth Surfaced Tough Elastomeric Coated Fibrous Batt, issued May 18, 1993 (hereinafter "the '988 patent") disclose coated fibrous batt duct liners and apparatuses for and methods of making such coated fibrous batt duct liners. The disclosures of the '370 patent and the '988 patent are hereby incorporated herein by reference in their entirety.

While the disclosures of the '370 patent and the '988 patent have been publicly available for over seven years and over five years respectively, there has remained a need for foam insulation sheet duct liners with smoother interior surfaces to reduce the accumulation of infectious agents and other contaminates on the interior surface of such duct liners and to reduce the frictional resistance to air flow through the air ducts.

SUMMARY OF THE INVENTION

The present invention provides a solution to the above problems which can be used with both closed cell and open cell foams. The foam insulation sheet of the present invention has a first major surface, e.g. The interior surface of a duct liner over which gases flow within a duct, coated with a relatively smooth, tough elastomeric coating of substantially uniform thickness. Preferably, the coating has a tough skin and penetrates into interstices of the major surface of the foam sheet to firmly bond the elastomeric coating to the foam sheet.

The coating is formed from a cross-linkable elastomeric aqueous emulsion. A cross-linkable emulsion contains monomers and polymers, some of which have multiple polymerizable sites to effect cross-linking to a three-dimensional polymer. Aqueous acrylic emulsions are preferred.

The coating is applied as a frothed cross-linkable elastomeric aqueous emulsion composition (preferably an aqueous cross-linkable acrylic latex emulsion) to one major surface of a foam insulation sheet. A doctor blade or similar means presses the emulsion composition into the interstices of the major surface of the foam insulation sheet and forms a coating layer on the major surface of the foam insulation sheet which has a generally uniform thickness and a relatively smooth surface. The cross-linkable elastomeric aqueous emulsion is then heated to cure the emulsion and form the relatively smooth tough coating.

In one embodiment of the method of the present invention, a tough skin is formed on the coating by contacting the frothed cross-linkable elastomeric aqueous emulsion composition (preferably an aqueous cross-linkable acrylic latex emulsion), applied to the major surface of the foam insulation sheet, with a hot ironing surface to dewater an exposed surface of the frothed aqueous cross-linkable acrylic latex emulsion and free bubbles from the exposed surface of the frothed aqueous cross-linkable acrylic latex emulsion, prior to curing the remainder of the frothed aqueous cross-linkable acrylic latex emulsion.

The coated foam insulation sheet duct liner of the present invention, not only has a smooth, tough coating with less irregularities for accumulating infectious agents and other contaminates, but, when compared to foam insulation sheets currently being used as duct liners, the coated foam insulation sheet of the present invention can have superior sound absorption, fire and smoke properties.

While the coated foam insulation sheet of the present invention is particularly suited for use as a duct liner, the coated foam insulation sheet of the present invention can be used for other applications where smooth, tough relatively durable surfaces are desired or required. In addition to having the first major surface coated, the foam sheet may have its lateral edges coated as well as the second major surface for certain duct liner or other applications.

BRIEF DESCRIPTION OF THE DRAWINGS

FIG. 1 is a schematic illustration of one embodiment of the apparatus for carrying out the method of the present invention.

FIG. 3 is a schematic perspective illustration of a coated foam insulation sheet of the present invention.

FIG. 4 is an enlarged fragmentary sectional view of the circled portion of the coated foam insulation sheet of FIG. 3 after the coating has been ironed and cured to form a smooth tough skin on the coating.

DESCRIPTION OF THE PREFERRED EMBODIMENTS

Figure 2:
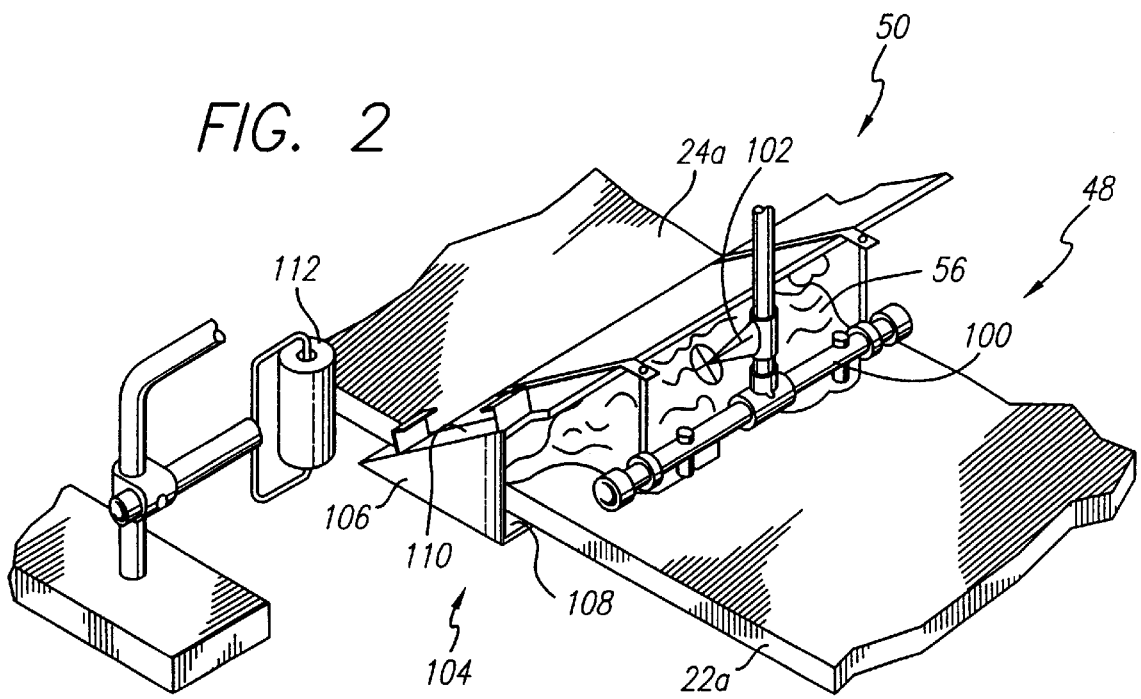
FIG. 2 is a schematic perspective view of a coating applicator and doctor blade assembly which can be used in the apparatus of FIG. 1.

As shown in FIGS. 3 and 4, the coated foam insulation sheet 20 of the present invention includes a foam insulation sheet 22 and a coating 24 covering one major surface of the foam insulation sheet. As used herein the term "sheet" includes both individual sheets of foam insulation and a continuous sheet of foam insulation. The foam insulation sheets typically range from about one half of an inch to about two inches thick, are about eight feet long by about four feet wide, and have densities less than six pounds per cubic foot and preferably, less than about one pound per cubic foot.

While the invention can be used with both closed cell and open cell foam insulation sheets, the invention is especially suited for use with open cell foam insulation sheets and provides such open cell foam insulation sheets with a relatively smooth, tough, durable, puncture resistant, erosion resistant surfaces that do not as readily collect or accumulate, due to their smoother surfaces, infectious agents or other contaminates. The coating does not eliminate the acoustic absorption of the open cell foams and may even enhance the acoustical properties of such foams. In addition, the coating 24 can include fire retardant particulate additives, bactericides, fungicides, biocides and other desirable additives. Examples of foam sheets which can be used in the present invention include, but are not limited to, polyimide-amide, polyimide, polyamide, polyurethane and melamine foam sheets.

A typical coating composition includes an aqueous acrylic emulsion including a catalyst to initiate cross-linking of the composition in response to applied heat. The coating composition may include pigments, inert fillers, fire retardant particulate additives, bactericides, fungicides, biocides, rheology modifiers, and curing catalysts. However, the cross-linkable aqueous acrylic emulsion should not be a pressure-sensitive adhesive.

A typical froth coating used for coating the foam insulation sheet is:

|  | Weight Percent |
| --- | --- |
| Aqueous Acrylic Latex Emulsion (Not Pressure-Sensitive) | 20–90 |
| Curing Catalyst | 0.1–1.0 |
| Froth Aids | 1–10 |
| Foam Stabilizer | 1–5 |
| Mineral Filler, including Flame Retardants | 0–60 |
| Color Pigments | 0–5 |
| Rheology Control Thickener | 1–6 |
| Fungicide | 0.1–0.3 |

The solids content of the froth coating is between about 40 and about 60 weight percent, preferably, between about 49 and about 51 weight percent and most preferably about 50 weight percent. The viscosity of the froth coating, as applied, is preferably between about 18,000 and about 20,000 and most preferably about 20,000. The froth density is measured as a "cup weight", i.e., the weight of frothed coating composition in a 16-ounce paper cup, level full. A cup weight of a about 210 grams plus or minus 20 grams is typical.

The coating 24 has a substantially uniform thickness throughout the major surface of the foam insulation sheet 22 with a weight between about 10 and about 30 grams per square foot of surface area and preferably about 18 grams per square foot of surface area. As best illustrated in FIG. 4, the coating 24 has a smooth exposed surface 26 which forms the interior surface of the duct liner and penetrates into the intertices and/or irregularities of the major surface 28 of the foam sheet, especially the interstices and/or irregularities of the major surface of an open cell foam sheet, to form a strong bond with the foam insulation sheet. In a preferred embodiment of the coated foam insulation sheet of the present invention, the exposed surface of the coating 24 is a tough, smooth surfaced skin 30 formed on the coating 24 by contacting the frothed surface of the coating composition with a heated ironing surface prior to curing the entire coating as will be discussed in more detail below. The skin 30 provides the coating and consequently, the coated foam insulation sheet 20 with an even tougher, smoother, more durable puncture and erosion resistant exposed or interior surface.

Figure 5:
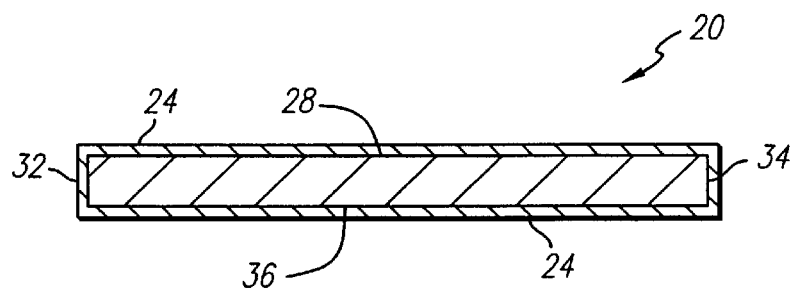
FIG. 5 is a schematic transverse vertical cross section of a coated foam insulation sheet of the present invention.

As shown in FIG. 5, in addition to having the first major surface 28 coated as described above, the coated foam insulation sheet 20 may also have its lateral edges 32 and 34 coated and/or its second major surface 36 coated with the coating 24. The portions of the smooth surfaced coating 24 covering the lateral edges 32 and 34 and/or the second major surface 36 may or may not have the smooth surfaced skin 30 formed on the coating 24 by contacting the frothed surface of the coating with a heated ironing surface prior to curing the entire coating throughout its thickness.

FIG. 1 schematically illustrates a production line 40 for making the coated foam insulation sheet 20 of the present invention. The production line 40 includes slide plates or conveyors 42, 44 and 46 over which the foam insulation sheet(s) 22 are conveyed as the foam insulation sheet(s) are coated to form the coated foam insulation sheet(s) 20. As the foam insulation sheet(s) are conveyed through the production line on the slide plates or conveyors 42, 44 and 46, the foam insulation sheet(s) 22 sequentially pass through a coating applicator 48; a doctor blade 50 or similar thickness controlling and surfacing device; an ironing apparatus 52, if used, for forming a skin 30 on the coating 24, and a heating chamber or curing oven 54.

The foam insulation sheet(s) 22, in continuous or individualized form, move from left to right through the production line 40 and are transformed from uncoated foam insulation sheet(s) 22a to coated foam insulation sheets 22b by the method of the present invention. A coating composition, in the form of a froth 56, is applied at ambient temperatures to a major surface of each foam insulation sheet 22a by the coating applicator 48. As shown in FIG. 2, the coating applicator 48 includes a header 100 which extends transversely across the width of the foam insulation sheet 22a to dispense the frothed coating composition 56 onto the major surface of the foam insulation sheet. The quantity of frothed coating composition 56 delivered to the header 100 and thus, to the major surface of the foam insulation sheet 22a can be controlled by valve mechanism 102.

After the frothed coating composition 56 has been applied to the major surface of a foam insulation sheet 22a, the frothed coating composition 56 is then pressed or compressed into interstices and/or irregularities of the upper major surface 28 of the foam insulation sheet 22 and shaped or leveled into a coating 24a having a relatively smooth exposed surface (compared to the major surface 28 of the foam insulation sheet) and uniform thickness by the doctor blade 50 or similar leveling and pressing device. As shown in FIG. 2, the doctor blade 50 can include dam members 104 (only one side of the doctor blade 50 is illustrated) adjacent each lateral edge of the foam insulation sheet 22a. Each dam member 104 has an exterior wall 106, which in conjunction with a lower planar horizontal surface 108 and an upper planar diagonal surface 110 contains the frothed coating composition 56 within the dam member 104 to apply the frothed coating composition to the edge of the foam insulation sheet 22a and cause any excess frothed coating material 56 to be recirculated along the edge and back onto the major surface of the foam insulation sheet 22a. Rotatable rollers 112 can be located immediately downstream of the doctor blade 50 to further distribute and smooth the surface of the coating composition on the edges of the foam insulation sheet. These rollers can be metallic and heated to form an ironing surface that forms a smooth surfaced skin on coating 24 covering the edges of the foam insulation sheet like the skin that can be formed on portions of the coating covering the major surface(s) of the foam insulation sheet.

In the preferred method of the present invention, the foam insulation sheet 22 with its relatively smooth surfaced coating 24a is then passed through the heated ironing apparatus 52 which is used to form an even smoother, tougher skin 30 on the exposed surface of the coating 24 than is formed when the coating 24a is cured immediately following its passage beneath the doctor blade 50 by passing the coated foam insulation sheet 22 through the heating chamber or curing oven 54. As shown in FIG. 1, a continuous smooth surface, stainless steel searing belt 58, moving in the direction indicated by the arrow 60, over idler rollers 62, 64, 66 and a drive roller 68 (driven by a conventional drive means 70) is brought into contact with the exposed surface of the frothed coating composition as the foam insulation sheet 22 passes through the heated ironing apparatus 52. A heat source 72 heats the continuous stainless steel searing belt 58 to a temperature between about 300° F. and about 500° F. and preferably to about 400° F. The heat from the continuous stainless steel searing belt 58 is transmitted to the upper or exposed surface of the coating composition from the heated continuous stainless steel belt 58 when the belt is brought into contact with the upper or exposed surface of the coating composition to dewater the coating composition at and adjacent the exposed surface; to free froth bubbles from the coating composition at and adjacent the exposed surface; to achieve a cross-linking cure of the coating composition at and immediately adjacent the exposed surface; and to provide the exposed surface of the coating 24 with an even smoother and tougher skin 30. The heating source 72 may be a gas burner, an electrical radiant heater, or any other suitable heater which will heat the continuous stainless steel searing belt 58 to the temperature required for drying and curing the coating composition at and immediately adjacent its exposed surface. Rather than a continuous stainless steel searing conveyor, as shown, a heated searing roll may also be used for drying and curing the coating composition at and immediately adjacent its exposed surface 26.

As the coated foam insulation sheet 22 proceeds from the heated ironing apparatus 52 to the heated chamber or curing oven 54, the coating 24b has an at least substantially cured and preferably, fully cured film or skin 30 with a relatively smooth exposed surface 26 and an essentially uncured layer 74 between the skin 30 and the major surface 28 of the foam insulation sheet 22. The coated foam insulation sheet 22 then passes through the heating chamber or curing oven 54 where the curing of the coating 24 is completed. Within the heated chamber or curing oven 54, the coated foam insulation sheet is heated to a temperature between about 300° F. and about 450° F. (preferably about 400° F.) and maintained at that temperature until the coating is cured. The heat source 76 may be infra-red lamps, a radiant gas burner or other conventional heating sources. Preferably, the heated chamber or curing oven is lined with thermal insulation 80 and 82 for thermal efficiency.

The coated foam insulation sheet 20b, leaving the heated chamber or curing oven 54, has a relatively smooth, tough, cured, dried elastomeric coating 24 covering the major surface 28 of the foam insulation sheet 22. In addition to the smooth tough surface the remainder of the coating, between the surface skin 30 and the major surface of the foam insulation sheet 22, is dried; substantially free of froth bubbles; and has penetrated into the interstices and/or irregularities of the major surface 28 of the foam insulation sheet 22 to form a good strong bond with the foam insulation sheet. Thus, the coated foam insulation sheet 20, leaving the heated chamber or curing oven 54, is ready for further processing such as, but not limited to, applying a coating to the second major surface of the foam insulation sheet to form a coated foam insulation sheet as shown in FIG. 5, packaging, or cutting and sizing for particular applications. One method of forming a coating on the second major surface of the foam insulation sheet 22 would be to pass the partially coated foam insulation sheet back through the production line 40 with the second major surface of the foam insulation sheet as the upper surface.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A coated foam duct liner insulation sheet comprising:

an open cell foam insulation sheet having first and second major surfaces and lateral edge surfaces; and an elastomeric coating of substantially uniform thickness covering the first major surface of the foam sheet; the elastomeric coating having a weight between about 10 grams per square foot and about 30 grams per square foot and having thereon a smooth, tough exposed surface skin that is smoother than the first major surface of the foam sheet; the smooth, tough exposed surface skin of the elastomeric coating being formed on the coating by contacting a frothed aqueous cross-linkable elastomeric emulsion, applied to the first major surface of the foam sheet, with a hot ironing surface to dewater the frothed aqueous cross-linkable elastomeric emulsion at and adjacent an exposed surface of the frothed aqueous cross-linkable elastomeric emulsion, to free bubbles from the frothed aqueous cross-linkable elastomeric emulsion at and adjacent the exposed surface of the frothed aqueous cross-linkable elastomeric emulsion, and to achieve a cross-linking cure of the frothed aqueous cross-linkable elastomeric emulsion at and adjacent the exposed surface of the frothed aqueous cross-linkable elastomeric emulsion prior to curing the remainder of the frothed aqueous cross-linkable elastomeric emulsion; and the elastomeric coating penetrating interstices in the first major surface of the foam sheet to firmly bond the elastomeric coating to the foam sheet.

2. The coated foam duct liner insulation sheet according to claim 1, wherein:

the lateral edge surfaces of the foam sheet are coated with the elastomeric coating.

3. The coated foam duct liner insulation sheet according to claim 2, wherein:

the second major surface of the foam sheet is coated with the elastomeric coating.

* * * * *